United States Patent
Bruns

(10) Patent No.: US 12,083,492 B2
(45) Date of Patent: Sep. 10, 2024

(54) FILTER MATERIAL FOR THE ADSORPTION OF PHOSPHATE IN SOIL FILTERS

(71) Applicant: Polyplan-Kreikenbaum Gruppe GmbH, Bremen (DE)

(72) Inventor: Stefan Bruns, Rotenburg (DE)

(73) Assignee: Polyplan-Kreikenbaum Gruppe GmbH, Bremen (DE)

(*) Notice: Subject to any disclaimer, the term of this patent is extended or adjusted under 35 U.S.C. 154(b) by 3 days.

(21) Appl. No.: 18/028,246

(22) PCT Filed: Sep. 28, 2021

(86) PCT No.: PCT/EP2021/076609
§ 371 (c)(1),
(2) Date: Mar. 24, 2023

(87) PCT Pub. No.: WO2022/064056
PCT Pub. Date: Mar. 31, 2022

(65) Prior Publication Data
US 2023/0372891 A1    Nov. 23, 2023

(30) Foreign Application Priority Data
Sep. 28, 2020   (EP) .................................. 20198750

(51) Int. Cl.
*C02F 1/28*     (2023.01)
*B01J 20/04*    (2006.01)
(Continued)

(52) U.S. Cl.
CPC ............. *B01J 20/06* (2013.01); *B01J 20/041* (2013.01); *B01J 20/043* (2013.01); *B01J 20/10* (2013.01); *B01J 20/28004* (2013.01); *B01J 20/28011* (2013.01); *B01J 20/28016* (2013.01); *B01J 20/2803* (2013.01); *B01J 20/3204* (2013.01);
(Continued)

(58) Field of Classification Search
CPC ........ B01J 20/041; B01J 20/043; B01J 20/06; B01J 20/10; B01J 20/28004; B01J 20/28011; B01J 20/28016; B01J 20/2803; B01J 20/3204; B01J 20/3223; B01J 20/3236; B01J 20/3293; C02F 1/281;
(Continued)

(56) References Cited

U.S. PATENT DOCUMENTS

2008/0156489 A1* 7/2008 Pershikova ............... C09K 8/80
166/280.1
2012/0322696 A1* 12/2012 Hayes .................... B01D 15/08
507/272

FOREIGN PATENT DOCUMENTS

| CN | 107059546 A | 8/2017 |
| JP | 35599055 B2 | 9/2004 |
| WO | 2008064504 A1 | 6/2008 |

OTHER PUBLICATIONS

Human-assisted machine translation of Tables and Figures of JP 3559905 B2.*
(Continued)

*Primary Examiner* — Benjamin L Lebron
(74) *Attorney, Agent, or Firm* — Banner & Witcoff, Ltd.

(57) ABSTRACT

The present invention relates to a synthetic filter material comprising grit, one or more oxides or hydroxides of Fe, La and/or Al, cement, fast-setting binder and water, which can serve as filter material for soil filters for phosphate adsorption, and to a process for producing the filter material.

14 Claims, 1 Drawing Sheet

(51) Int. Cl.
  *B01J 20/06* (2006.01)
  *B01J 20/10* (2006.01)
  *B01J 20/28* (2006.01)
  *B01J 20/32* (2006.01)
  *C02F 101/10* (2006.01)
  *C02F 103/00* (2006.01)
  *C02F 103/42* (2006.01)

(52) U.S. Cl.
  CPC ....... *B01J 20/3223* (2013.01); *B01J 20/3236* (2013.01); *B01J 20/3293* (2013.01); *C02F 1/288* (2013.01); *C02F 1/281* (2013.01); *C02F 2101/105* (2013.01); *C02F 2103/007* (2013.01); *C02F 2103/42* (2013.01)

(58) Field of Classification Search
  CPC ................ C02F 1/288; C02F 2101/105; C02F 2103/007; C02F 2103/42
  See application file for complete search history.

(56) References Cited

OTHER PUBLICATIONS

Vohla C et al: "Filter materials for phosphorous removal from wastewater in treatment wetlands—A review," Ecological Engineering, Elsevier, Amsterdam, NL, Bd. 37, Nr. 1, 1. Jan. 1, 2011.
International Search Report and Written Opinion dated Jan. 14, 2022 for PCT/EP2021/076609.

\* cited by examiner

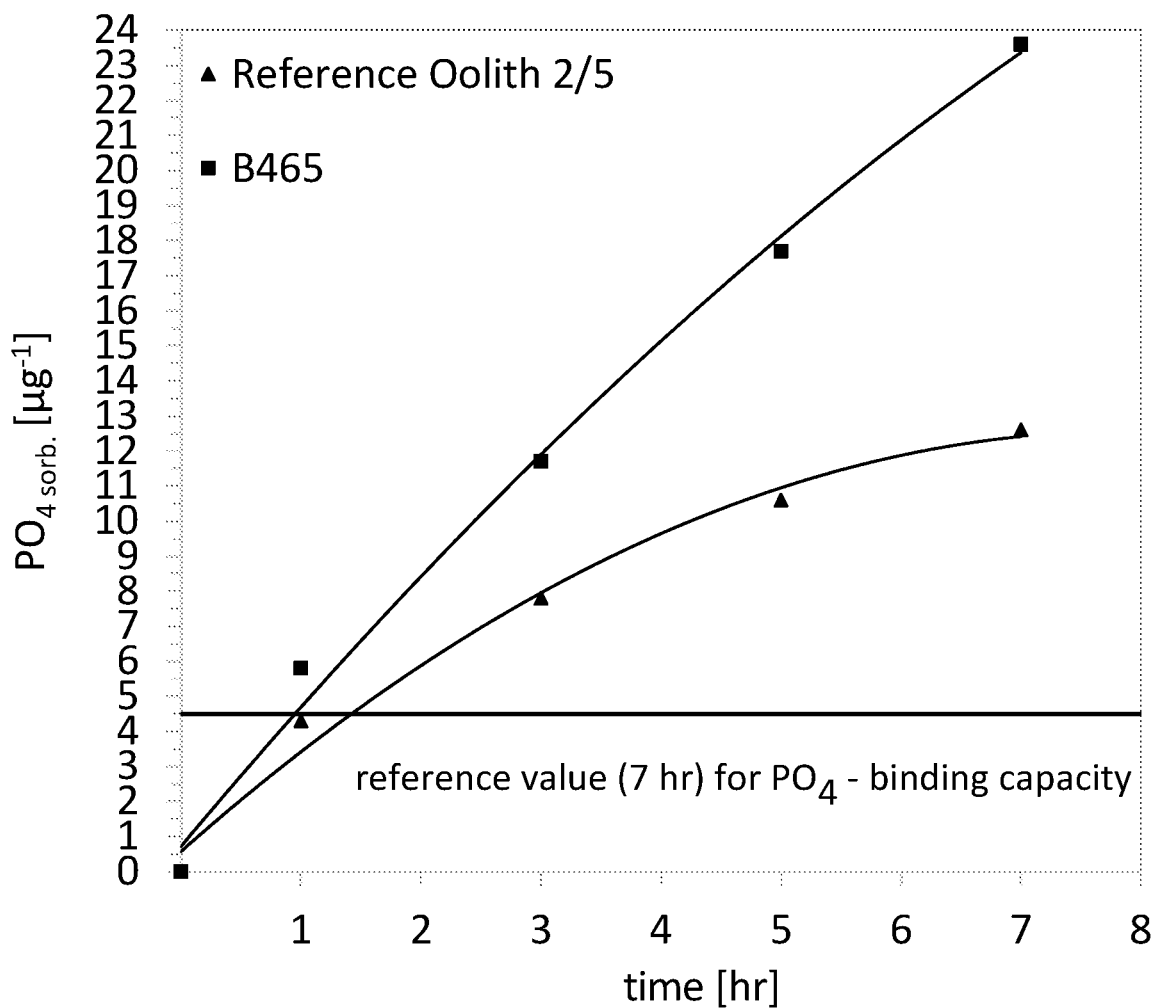

FILTER MATERIAL FOR THE ADSORPTION OF PHOSPHATE IN SOIL FILTERS

CROSS-REFERENCE TO RELATED APPLICATIONS

This application is a U.S. National Stage application under 35 U.S.C. § 371 of International Application PCT/EP2021/076609 (published as WO 2022/064056 A1), filed Sep. 28, 2021 which claims the benefit of priority to Application EP 20198750.0, filed Sep. 28, 2020. Benefit of the filing date of these prior applications is hereby claimed. Each of these prior applications is hereby incorporated by reference in its entirety.

The present invention relates to a synthetic filter material comprising grit, one or more oxides or hydroxides of Fe, La and/or Al, cement, fast-setting binder and water, which can serve as filter material for soil filters for phosphate adsorption, and to the process for producing the filter material.

INTRODUCTION

Sprinkled and overflowed soil filters with different filter materials are increasingly being used for water treatment in lakes, rivers and natural baths. The aim of the use is to permanently ensure the water quality defined by the respective demand for use.

The cleaning performance of soil filters is achieved by various mechanisms. In addition to mechanical filtration of organic and inorganic substances, a pH-stabilizing effect and biological degradation of organisms (phytoplankton, viruses, bacteria, etc.) via the biofilm formed, phosphorus adsorption processes on the filter material are particularly relevant. Phosphorus is usually the limiting factor for biological growth in lakes and natural baths. As a result of the binding of phosphorus in the filter, it is permanently removed from the water, as a result of which the water quality is permanently improved.

STATE OF THE ART

While phosphorus elimination rates of 20-30% per filter pass are achieved when natural filter materials such as Oolith are used, elimination rates of 50-60% can be achieved when iron-based synthetic filter materials are used.

However, a disadvantage of known materials for phosphate adsorption in soil filters is that they can only be stored to a limited extent and require relatively large amounts of cost-intensive adsorption materials.

TECHNICAL OBJECT OF THE INVENTION

It is therefore an object of the present invention to provide a filter material which can be stored for a relatively long time and can be produced more simply. In particular, however, a constant adsorption capacity for phosphorus is to be achieved with a simultaneous reduction in the amount of adsorption material, or a filter material with improved adsorption capacity is to be provided.

DETAILED DESCRIPTION OF THE INVENTION

The object is achieved by a filter material comprising 50 to 90% by weight of grit having a grain size of 1 to 20 mm; 1 to 25% by weight of one or more oxides and/or hydroxides of Fe, La and/or Al; 1 to 12% by weight of cement; 0.1 to 5% by weight of fast-setting binder and 1 to 10% by weight of water, in each case based on the total weight of the filter material.

Surprisingly, it has been found that the filter material according to the invention enables an improved phosphorus adsorption capacity with a simultaneously reduced amount of adsorption material. Furthermore, the grain size used enables longer storage and use, since clumping or clogging is made more difficult.

Grit

The grit can preferably be present in a weight amount of 60-80% by weight, particularly preferably 70-79% by weight, in each case based on the total weight of the filter material.

The grit can preferably be a limestone or a gravel based on silicon dioxide. Limestone is particularly preferred. The particularly preferred limestone has a particularly high affinity for phosphorus, as a result of which the phosphorus adsorption capacity of the material is additionally increased.

The grit can preferably have a grain size of 2 to 8 mm, particularly preferably of 2 to 5 mm (2/5) or of 5 to 8 mm (5/8). The grain size can be determined in accordance with DIN EN 9331.

The grit can preferably have a $SI_{20}$ particle shape.

The grit can preferably have a $G_c$ 90/15 and/or $G_c$ 85/20 grain size distribution. The grit particularly preferably has a grain size distribution with a fraction of particles <2 mm of less than 2% by weight.

The grit preferably has an abrasion resistance at which the maximum difference after the abrasion test in accordance with DIN EN 932-2:1999 and DIN EN 933-1:2012 for a grain size of 2 to 8 mm is ≤6% by weight.

The grit can preferably have a dry bulk density of 2 to 3 $g/cm^3$.

The grit can preferably have a pH increase in constant flow rate within a closed system after 20 min of at most 1.0 pH units. Tap water with a pH of about 8 can be used for the measurement.

The grit can preferably have a weathering of at most 2% by weight. The weathering can be determined in accordance with DIN EN 932-2:1999 and DIN EN 933-1:2012.

Oxide/Hydroxide

The oxides and/or hydroxides of iron (Fe), lanthanum (La) and aluminum (Al) serve as binding partners for the phosphorus (P). Iron can be present both in the +2 oxidation state and in the +3 oxidation state. Lanthanum and aluminum are preferably present in the +3 oxidation state. Iron oxide and iron hydroxide are preferred. Iron oxide is particularly preferred.

The oxides and/or hydroxides can preferably be present in a weight amount of 3-20% by weight, particularly preferably 4-15% by weight, very particularly preferably 5-10% by weight, in each case based on the total weight of the filter material.

The iron oxide preferably has an iron content of at least 60% by weight, based on the dry matter.

The iron hydroxide preferably has an iron content of at least 40% by weight, based on the dry matter.

The lanthanum oxide or lanthanum hydroxide preferably has a lanthanum content of at least 65% by weight, based on the dry matter.

The aluminum oxide preferably has an aluminum content of at least 40% by weight, based on the dry matter.

The aluminum hydroxide preferably has an aluminum content of at least 30% by weight, based on the dry matter.

The oxides and/or hydroxides can preferably have a d50 grain size distribution of 20 to 30 μm. In particular, iron oxide can preferably have a d50 grain size distribution of 20 to 30 μm. The grain size distribution can be determined, for example, by sieving.

The iron oxide Methatec DG1/L (Terravis GmbH, Münster) is particularly preferred.

Cement

The cement can preferably be present in a weight amount of 2-10% by weight, particularly preferably 5-9% by weight, in each case based on the total weight of the filter material.

The cement can be Portland cement, preferably Portland cement of the CEM I, CEM II, CEM III, in particular CEM IIIC, or CEM IV type, or aluminous cement. The cement can preferably have the strength class 42.5 R or 32.5 R. Cement of the strength class 42.5 R is particularly preferred. A higher strength of the cement enables a relatively long stability of the filter material according to the invention and consequently also of a soil filter which comprises the filter material according to the invention.

Fast-Setting Binder

The fast-setting binder can preferably be present in a weight amount of 0.2-4.0% by weight, particularly preferably 0.3-2.0% by weight, very particularly preferably 0.4-1.0% by weight, in each case based on the total weight of the filter material.

The fast-setting binder can comprise calcium aluminate. Preferably, the fast-setting binder can comprise a composition of $Al_2O_3$, $CaO$, $SiO_2$, $Fe_2O_3$, $MgO$ and/or $TiO_2$. The fast-setting binder can preferably have a specific surface area of more than 4,000 $cm^2/g$, preferably 4,100 to 4,600 $cm^2/g$. Furthermore, the fast-setting binder can have a 500 μm sieve residue of less than 2.5% by weight, preferably of less than 1.0% by weight. The fast-setting binder preferably has a bulk density of 1100-1300 $kg/m^3$. The fast-setting binder preferably has a very short setting time, a very rapid development of strength, excellent properties at low temperatures, a high final strength and/or a robust formulation.

The fast-setting binder is particularly preferably Ternal SE (Kerneos SA, Neuilly sur Seine, France).

Water

The weight amount of water can preferably be 2 to 8% by weight, preferably 3-7.5% by weight, particularly preferably 4-7% by weight, based on the total weight of the filter material.

Properties of the Filter Material

The filter material according to the invention preferably has a phosphorus loading sum after 7 hours of more than 15 μg $PO_4$/g filter material, preferably of more than 18 μg $PO_4$/g filter material, particularly preferably of more than 21 μg $PO_4$/g filter material.

Method

The present invention also relates to a method for producing the filter material according to the invention. This comprises the steps: a) providing a mixture of the one or more metal oxides or metal hydroxides, the cement and the fast-setting binder; b) adding the mixture from step a) to the grit or adding the grit to the mixture from step a); c) mixing the mixture obtained in step b); d) adding water to the mixture obtained in step c) and then mixing.

The mixture from step a) is preferably added to the grit in step b).

The mixing in steps c) and/or d) can preferably be carried out in a compulsory mixer.

The final mixing according to step d) is preferably carried out within 1-10 minutes, preferably 1-5 minutes, particularly preferably 1-3 minutes.

The amount of water according to step d) is preferably adapted to the initial moisture of the grit. Particularly preferably, an amount of water of 4.5% by weight, based on the total weight of the composition, is initially added here. The addition is preferably stopped as soon as the mixture is bound. The water content is preferably 7.5% by weight or less, since this is advantageous for the frost resistance of the material.

The filter material according to the invention is suitable for the adsorption of phosphate, for example for use in phosphate adsorption shafts or phosphate adsorbers. The filter material according to the invention is preferably suitable for the adsorption of phosphate in overflowed phosphate adsorption shafts or phosphate adsorbers. The filter material according to the invention is particularly preferably suitable for the adsorption of phosphate in overflowed and sprinkled phosphate adsorption shafts or phosphate adsorbers. The filter material according to the invention is very particularly preferably suitable for the adsorption of phosphate in overflowed and sprinkled phosphate adsorption shafts or phosphate adsorbers in which exclusively the filter material according to the invention is used.

The present invention also relates to a soil filter which comprises the filter material according to the invention, and to the use of the soil filter according to the invention for the adsorption of phosphate.

The soil filter according to the invention is particularly suitable for use in natural baths or lakes, in particular bathing lakes.

The present invention also relates to a phosphate adsorption shaft or phosphate adsorber which comprises the filter material according to the invention, and to the use of the phosphate adsorption shaft or phosphate adsorber according to the invention for the adsorption of phosphate.

The phosphate adsorption shaft or phosphate adsorber can preferably be overflowed, particularly preferably overflowed and sprinkled. The phosphate adsorption shaft or phosphate adsorber can very particularly preferably be overflowed and sprinkled and contains exclusively the filter material according to the invention as filter material.

The phosphate adsorption shaft or phosphate adsorber according to the invention is particularly suitable for use in natural baths or lakes, in particular bathing lakes.

All combinations of preferred ranges or of embodiments are particularly preferred.

Further features and advantages of the invention will emerge from the following detailed description of exemplary embodiments.

Exemplary Embodiments

Phosphate Adsorption Test

Method

To determine the phosphate absorption, 10 g of the washed and dried starting material (50° C. in a drying cabinet) were weighed in and mixed with 30 ml of phosphate solution ($c(PO_4)$=2.0 mg/L). The sample was left in the solution for 1 h and shaken in between.

The solution was then removed to determine the concentration of phosphate. In order to be able to make a statement about the degree of coverage of the surface, the material was shaken in further steps with 30 ml of the starting solution and the decrease in concentration in the solution was determined. The phosphate concentration was measured photometrically in accordance with DIN EN ISO 6878 at 880 nm in accordance with SOP 8.3.

Tested Material

Experimental Example 1 (B465)

The composition of Experimental Example 1 (B465) is given in Table 1.

TABLE 1

| Composition of Experimental Example 1 (B465) | |
|---|---|
| Material | % by weight |
| Grit 5/8[a] | 77.78 |
| Iron Oxide[b] | 5.56 |
| Cement[c] | 8.33 |
| Fast-setting binder[d] | 0.83 |
| Water | 7.5 |
| Total: | 100 |

[a]Limestone 10145 from Hermann Wegener GmbH & Co. KG, Hanover
[b]Methatec ® Iron Oxide DG1L from Terravis GmbH, Münster
[c]Strength class CEM II 42.5, Heidelberg Cement AG, Hanover
[d]Ternal SE from Kerneos SA, Neuilly sur Seine, France Preparation Method 50 kg of iron oxide, 75 kg of cement and 7.5 kg of fast-setting binder were mixed. The mixture was then added to 700 kg of grit 5/8 and mixed in a compulsory mixer. Finally, 67.5 kg of water were added and mixed again.

Results

In Experimental Example 1 according to the invention, the grit was coated with a dark grey coating. Even after the washing process and the seven-hour test period with mechanical action, this did not dissolve from the grit.

The phosphate adsorption test carried out showed almost complete adsorption of the added phosphate. A loading sum of 23.56 μg phosphate/g filter material resulted after 7 hours.

FIG. 1 shows the adsorption curve of Experimental Example 1 (B465) according to the invention and the adsorption curve of a reference material (natural Oolith grey with a grain size of 2-5 mm).

Table 2 shows the phosphate adsorption of Experimental Example 1 as a table of values.

TABLE 2

| Phosphate adsorption Experimental Example 1 Phosphate adsorption | |
|---|---|
| Test period [h] | Total loading [μg/g sorbed PO$_4$] |
| 0. hour | 0.00 |
| 1. hour | 5.93 |
| 3. hour | 11.84 |
| 5. hour | 17.75 |
| 7. hour | 23.65 |

The invention claimed is:

1. A filter material for the adsorption of phosphate, comprising:
    50 to 90% by weight of grit with a grain size of 1 to 20 mm;
    1 to 25% by weight of one or more oxides and/or hydroxides of Fe, La and/or Al;
    1 to 12% by weight of cement;
    0.1 to 5% by weight of a binder comprising calcium aluminate; and
    1 to 10% by weight of water;
    in each case in relation to the total weight of the filter material.

2. The filter material according to claim 1, wherein the grain size is from 2 to 5 mm or from 5 to 8 mm.

3. The filter material according to claim 1, wherein the grit has a dry bulk density of 2 to 3 g/cm$^3$.

4. The filter material according to claim 1, wherein the grit has a pH-increase in constant flow within a closed system after 20 min of at most 1.0 pH unit.

5. The filter material according to claim 1, wherein the grit has weathering of at most 2 M %.

6. The filter material according to claim 1, wherein the grit has an abrasion resistance at which the maximum difference after the pulverization test according to DIN EN 932-2:1999 and DIN EN 933-1:2012 is ≤6% by weight for a grain size of 2 to 8 mm.

7. The filter material according to claim 1, wherein the metal oxide is iron oxide.

8. The filter material according to claim 7, wherein the iron oxide has a grain size distribution d50 of 20 to 30 μm.

9. The filter material according to claim 1, wherein the cement is Portland cement or aluminous cement.

10. A method for producing a filter material according to claim 1, the method comprising the steps of:
    a) providing a mixture of the metal oxide, the cement and the binder comprising calcium aluminate;
    b) adding the mixture from step a) to the grit or adding the grit to the mixture from step a);
    c) mixing the mixture that is obtained in step b);
    d) adding water to the mixture obtained in step c) and subsequently mixing it.

11. The method according to claim 10, wherein the mixing in steps c) and/or d) takes place in a compulsory mixer.

12. A soil filter that comprises the filter material according to claim 1.

13. A phosphate adsorption shaft or a phosphate adsorber that comprises the filter material according to claim 1.

14. A method of using the filter material according to claim 1, the method comprising adsorbing phosphate with the filter material.

* * * * *